(12) United States Patent
Guntur

(10) Patent No.: US 10,277,629 B1
(45) Date of Patent: Apr. 30, 2019

(54) SYSTEMS AND METHODS FOR CREATING A DECEPTION COMPUTING SYSTEM

(71) Applicant: Symantec Corporation, Mountain View, CA (US)

(72) Inventor: Ravindra Guntur, Mysore (IN)

(73) Assignee: Symantec Corporation, Mountain View, CA (US)

( * ) Notice: Subject to any disclaimer, the term of this patent is extended or adjusted under 35 U.S.C. 154(b) by 220 days.

(21) Appl. No.: 15/384,999

(22) Filed: Dec. 20, 2016

(51) Int. Cl.
*H04L 29/06* (2006.01)
*G06F 16/28* (2019.01)

(52) U.S. Cl.
CPC ........ *H04L 63/1491* (2013.01); *G06F 16/285* (2019.01); *H04L 63/1416* (2013.01); *H04L 63/1425* (2013.01); *H04L 63/1433* (2013.01)

(58) Field of Classification Search
CPC .............. H04L 63/1491; H04L 63/1416; H04L 63/1425; H04L 63/1433; G06F 17/30598
USPC .......................................................... 726/25
See application file for complete search history.

(56) References Cited

U.S. PATENT DOCUMENTS

| | | | |
|---|---|---|---|
| 8,125,898 B1 | 2/2012 | Strayer et al. | |
| 9,462,013 B1* | 10/2016 | Boss | H04L 63/1491 |
| 2006/0018466 A1* | 1/2006 | Adelstein | H04L 63/1425 |
| | | | 380/46 |
| 2006/0101515 A1* | 5/2006 | Amoroso | H04L 29/12009 |
| | | | 726/23 |
| 2006/0224677 A1* | 10/2006 | Ishikawa | G06Q 10/107 |
| | | | 709/206 |
| 2008/0104700 A1* | 5/2008 | Fagone | G06F 21/55 |
| | | | 726/22 |
| 2012/0174220 A1 | 7/2012 | Rodriguez | |
| 2013/0145465 A1* | 6/2013 | Wang | G06F 21/552 |
| | | | 726/23 |
| 2014/0137190 A1 | 5/2014 | Carey et al. | |
| 2015/0047032 A1* | 2/2015 | Hannis | H04L 63/1416 |
| | | | 726/23 |
| 2015/0058993 A1 | 2/2015 | Choi et al. | |
| 2016/0285894 A1* | 9/2016 | Nelms | H04L 63/145 |
| 2016/0301709 A1 | 10/2016 | Hassanzadeh et al. | |
| 2016/0323300 A1* | 11/2016 | Boss | H04L 63/1416 |
| 2016/0323301 A1* | 11/2016 | Boss | H04L 63/1416 |
| 2017/0046519 A1 | 2/2017 | Cam | |
| 2017/0109370 A1* | 4/2017 | Newhouse | G06F 17/30174 |
| 2017/0163682 A1* | 6/2017 | Yu | H04L 63/1491 |

OTHER PUBLICATIONS

Heckman et al.; Cyber Counterdeception: How to Detect Denial & Deception (D&D); available Mar. 2014; as accessed Feb. 5, 2016.

* cited by examiner

*Primary Examiner* — Michael S McNally
(74) *Attorney, Agent, or Firm* — FisherBroyles, LLP

(57) ABSTRACT

A computer-implemented method for creating a deception computing system may include (i) identifying, by a computing device, a dataset of security alert signatures from a set of client devices, (ii) determining, by the computing device, a set of software vulnerabilities based on the dataset of security alert signatures, (iii) clustering, by the computing device, the set of software vulnerabilities to increase a length of at least one potential attack path within a predetermined number of honeypot machines, and (iv) distributing, by the computing device and based on clusters of software vulnerabilities, a set of vulnerable software among a set of honeypot machines within a honeynet. Various other methods, systems, and computer-readable media are also disclosed.

20 Claims, 7 Drawing Sheets

SYSTEMS AND METHODS FOR CREATING A DECEPTION COMPUTING SYSTEM

BACKGROUND

Deception technology attempts to lure an attacker into attacking decoy computing systems to prevent the attacker from attacking other systems. For example, honeypots and honeynets attract an attacker and intentionally allow the attacker into the computing environment, keeping the attacker trapped within the environment. To effectively lure attackers, a deception system needs to use appropriate vulnerable software that attackers would try to exploit, based on likely attacks or crucial attacks that need to be prevented. After an attacker enters a deception system, the right vulnerabilities need to be deployed to trap the attacker for as long as possible.

Unfortunately, attacks and vulnerabilities generally change over time, and attackers may not continue to be attracted by older vulnerabilities. Additionally, in the example of a honeynet, attackers may suspect a deception system and leave the honeynet if multiple machines deploy the same vulnerable software or a machine deploys multiple unrelated vulnerabilities. Furthermore, with a large number of software and software versions, the number of possible configurations may quickly increase. Thus, it may be difficult to select the best combinations of vulnerabilities to use in trapping attackers. The instant disclosure, therefore, identifies and addresses a need for better systems and methods for creating a deception computing system.

SUMMARY

As will be described in greater detail below, the instant disclosure describes various systems and methods for creating a deception computing system. In one example, a computer-implemented method for creating a deception computing system may include (i) identifying, by a computing device, a dataset of security alert signatures from a set of client devices, (ii) determining, by the computing device, a set of software vulnerabilities based on the dataset of security alert signatures, (iii) clustering, by the computing device, the set of software vulnerabilities to increase a length of at least one potential attack path within a predetermined number of honeypot machines, and (iv) distributing, by the computing device and based on clusters of software vulnerabilities, a set of vulnerable software among a set of honeypot machines within a honeynet.

In one embodiment, the dataset of security alert signatures may include, for each security alert signature an identifier of an attack and/or a description of the attack. Additionally or alternatively, the dataset of security alert signatures may include a source identifier of an origin client device and/or a destination identifier of an attacked client device.

In some examples, determining the set of software vulnerabilities may include performing data mining on the dataset of security alert signatures, correlating a vulnerable software with a security alert signature, identifying an attack resulting from the vulnerable software, and/or identifying an attack path involving the vulnerable software. In these examples, the attack path may include a sequence of client devices compromised by related attacks and a sequence of vulnerable software on the compromised client devices.

In some embodiments, clustering the set of software vulnerabilities to increase the length of the potential attack path may include creating a matrix of attacks from origin honeypot machines to destination honeypot machines for the set of software vulnerabilities, calculating a likelihood of an attack traversing from an origin honeypot machine to a destination honeypot machine, and determining that a cluster of software vulnerabilities increases the likelihood of the attack traversing to the destination honeypot machine. Additionally or alternatively, clustering the set of software vulnerabilities to increase the length of the potential attack path may include dividing the software vulnerabilities into a number of different sets of software vulnerabilities based on the predetermined number of honeypot machines.

In one embodiment, distributing the set of vulnerable software among the set of honeypot machines may include assigning a distribution of vulnerable software to a honeypot machine based on a cluster of software vulnerabilities, assigning the distribution of vulnerable software to the honeypot machine based on a configuration of the set of honeypot machines, instructing the set of honeypot machines to install the set of vulnerable software, and/or sending a distribution of the set of vulnerable software to the set of honeypot machines to an administrator.

In one example, the computer-implemented method may further include distributing a new set of vulnerable software among the set of honeypot machines based on a change in the dataset of security alert signatures.

In one embodiment, a system for implementing the above-described method may include (i) an identification module, stored in memory, that identifies, by a computing device, a dataset of security alert signatures from a set of client devices, (ii) a determination module, stored in memory, that determines, by the computing device, a set of software vulnerabilities based on the dataset of security alert signatures, (iii) a clustering module, stored in memory, that clusters, by the computing device, the set of software vulnerabilities to increase a length of at least one potential attack path within a predetermined number of honeypot machines, and (iv) a distribution module, stored in memory, that distributes, by the computing device and based on clusters of software vulnerabilities, a set of vulnerable software among a set of honeypot machines within a honeynet. In addition, the system may include at least one processor that executes the identification module, the determination module, the clustering module, and the distribution module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify a dataset of security alert signatures from a set of client devices, (ii) determine a set of software vulnerabilities based on the dataset of security alert signatures, (iii) cluster the set of software vulnerabilities to increase a length of at least one potential attack path within a predetermined number of honeypot machines, and (iv) distribute, based on clusters of software vulnerabilities, a set of vulnerable software among a set of honeypot machines within a honeynet.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification.

Figure 1:
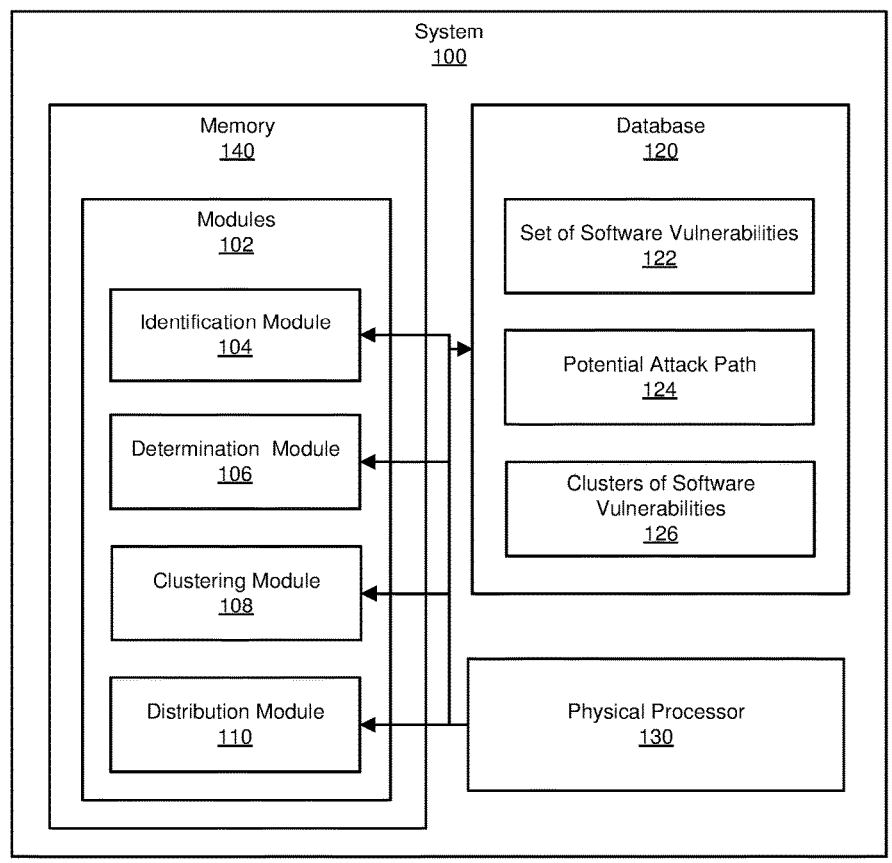
FIG. 1 is a block diagram of an example system for creating a deception computing system.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for creating a deception computing system. As will be explained in greater detail below, by automatically configuring vulnerable software on a set of honeypot machines, the systems and methods described herein may create a better deception system to trap attackers. For example, by evaluating data on actual attacks, the disclosed systems and methods may identify vulnerabilities that are currently exploited by attackers in a timely manner. Furthermore, by clustering different vulnerabilities for variety, the disclosed systems and methods may better prevent attackers from detecting the deception system.

In addition, the systems and methods described herein may improve the functioning of a computing device by encouraging lateral attacks within a honeynet to distract attackers from the legitimate computing device. These systems and methods may also improve the fields of cybersecurity and/or information security by automatically organizing a network of honeypot machines to maximize their usage as a decoy system for an organization.

Figure 2:
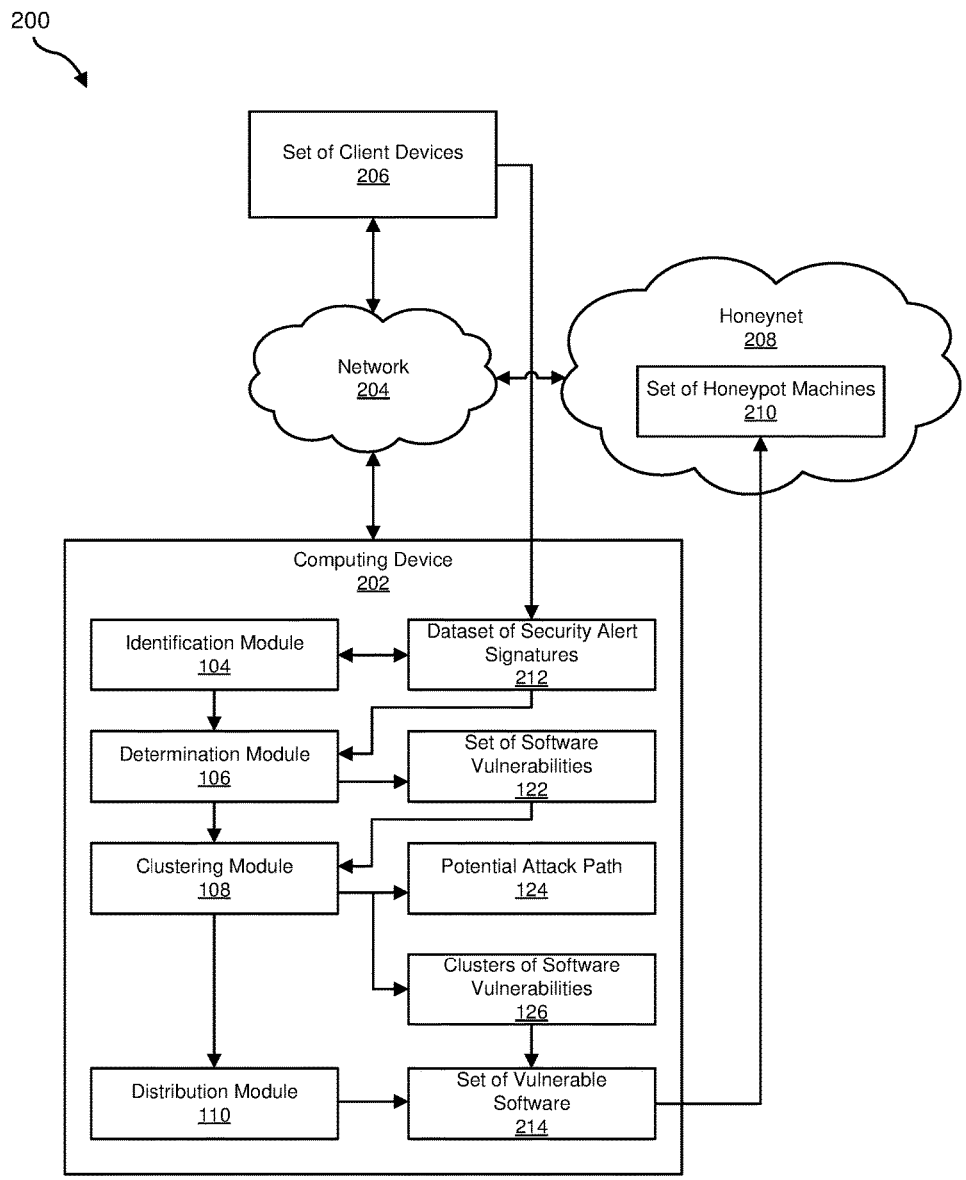
FIG. 2 is a block diagram of an additional example system for creating a deception computing system.

The following will provide, with reference to FIGS. 1 and 2, detailed descriptions of example systems for creating a deception computing system. Detailed descriptions of corresponding computer-implemented methods will also be provided in connection with FIG. 3. In addition, detailed descriptions of an example dataset of security alert signatures used to determine an example set of software vulnerabilities will be provided in connection with FIG. 4. Furthermore, detailed descriptions of an example clustering of software vulnerabilities will be provided in connection with FIG. 5. Finally, detailed descriptions of an example computing system and network architecture capable of implementing one or more of the embodiments described herein will be provided in connection with FIGS. 6 and 7, respectively.

FIG. 1 is a block diagram of example system 100 for creating a deception computing system. As used herein, the term "deception computing system" generally refers to a proactive computing defense system that distracts attackers by tempting them with exploitable vulnerabilities. Examples of deception computing systems may include, but are not limited to, decoy systems, honeypots, honeynets, canary traps, variations or combinations of one or more of the same, and/or any other suitable computing system. The terms "honeypot" and "honeypot machine," as used herein, generally refer to a computing device that uses digital bait, such as fake sensitive data or false opportunities to escalate privilege, to attract attackers. The term "honeynet," as used herein, generally refers to a network of two or more honeypot machines.

As illustrated in FIG. 1, example system 100 may include one or more modules 102 for performing one or more tasks. For example, and as will be explained in greater detail below, modules 102 may include an identification module 104 that identifies, by a computing device, a dataset of security alert signatures from a set of client devices. The term "security alert signature," as used herein, generally refers to a description or pattern, typically produced by a security product, that identifies an attack or security event on a computing system.

Modules 102 may additionally include a determination module 106 that determines, by the computing device, a set of software vulnerabilities based on the dataset of security alert signatures. The term "software vulnerability," as used herein, generally refers to a potential risk or weakness in a software element that may pose a security risk that can be exploited by an attacker. Modules 102 may also include a clustering module 108 that clusters, by the computing device, the set of software vulnerabilities to increase a length of at least one potential attack path within a predetermined number of honeypot machines. The term "attack path," as used herein, generally refers to a sequential digital mapping of actions taken by an attacker.

Modules 102 may further include a distribution module 110 that distributes, by the computing device and based on clusters of software vulnerabilities, a set of vulnerable software among a set of honeypot machines within a honeynet. Although illustrated as separate elements, one or more of modules 102 in FIG. 1 may represent portions of a single module or application or multiple modules or applications.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202, set of client devices 206, and/or set of honeypot machines 210). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate creating a deception computing system. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more databases, such as database 120. In one example, database 120 may be configured to store a set of software vulnerabilities 122, which may include information about software elements prone to attack, a potential attack path 124, which may include a possible series of attack actions within a honeynet, and/or clusters of software vulnerabilities 126, which may include groups of different vulnerable software elements. Database 120 may represent portions of a single database or computing device or a plurality of databases or computing devices. For example, database 120 may represent a portion of computing device 202, set of client devices 206 and/or set of honeypot machines 210 in FIG. 2. Alternatively, database 120 in FIG. 1 may represent one or more physically separate devices capable of being accessed by a computing device, such as computing device 202, set of honeypot machines 210, and/or set of honeypot machines 210 in FIG. 2.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a set of client devices 206 and a set of honeypot machines 210 within a honeynet 208 via a network 204. Alternatively, computing device 202, set of client devices 206, and honeynet 208 may all be in communication via network 204. In one example, all or a portion of the functionality of modules 102 may be performed by computing device 202, set of client devices 206, set of honeypot machines 210, and/or any other suitable computing system. Similarly, parts of set of client devices 206, set of honeypot machines 210, and/or computing device 202 may be merged into a single machine or computing system such that the functionality of each of modules 102 is provided within a single device.

As will be described in greater detail below, one or more of modules 102 from FIG. 1 may, when executed by at least one processor of computing device 202, set of client devices 206, and/or set of honeypot machines 210, enable computing device 202, set of client devices 206, and/or set of honeypot machines 210 to automatically configure honeynet 208. For example, and as will be described in greater detail below, identification module 104 may identify a dataset of security alert signatures 212 from set of client devices 206. Determination module 106 may determine set of software vulnerabilities 122 based on dataset of security alert signatures 212. Clustering module 108 may cluster set of software vulnerabilities 122 to increase a length of at least one potential attack path 124 within a predetermined number of honeypot machines. Distribution module 110 may distribute, based on clusters of software vulnerabilities 126, a set of vulnerable software 214 among set of honeypot machines 210 within honeynet 208.

In the example of FIG. 2, and as will be explained in greater detail below, computing device 202 may first identify and receive dataset of security alert signatures 212 from set of client devices 206 via network 204. Computing device 202 may then analyze dataset of security alert signatures 212 to determine set of software vulnerabilities 122. Next, computing device 202 may use set of software vulnerabilities 122 to extend potential attack path 124 and create clusters of software vulnerabilities 126. Finally, computing device 202 may send set of vulnerable software 214 to set of honeypot machines 210 in honeynet 208 via network 204.

Computing device 202, devices in set of client devices 206, and/or honeypots in set of honeypot machines 210 generally represent any type or form of computing device capable of reading computer-executable instructions. For example, computing device 202 may represent an administrative device that monitors set of client devices 206, devices in set of client devices 206 may represent endpoint devices running client-side security software, and honeypots within set of honeypot machines 210 may represent decoy endpoint devices that are similar to client devices. Additional examples of computing device 202, set of client devices 206, and/or set of honeypot machines 210 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, and/or any other suitable computing device.

Network 204 and/or honeynet 208 generally represents any medium or architecture capable of facilitating communication or data transfer. In one example, network 204 may facilitate communication between computing device 202, set of client devices 206, and honeynet 208, which may represent a system of honeypot machines and a network that connects them. In another example, honeynet 208 may further facilitate communication between computing device 202 and set of honeypot machines 210. In these examples, network 204 and/or honeynet 208 may facilitate communication or data transfer using wireless and/or wired connections. Examples of network 204 and/or honeynet 208 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
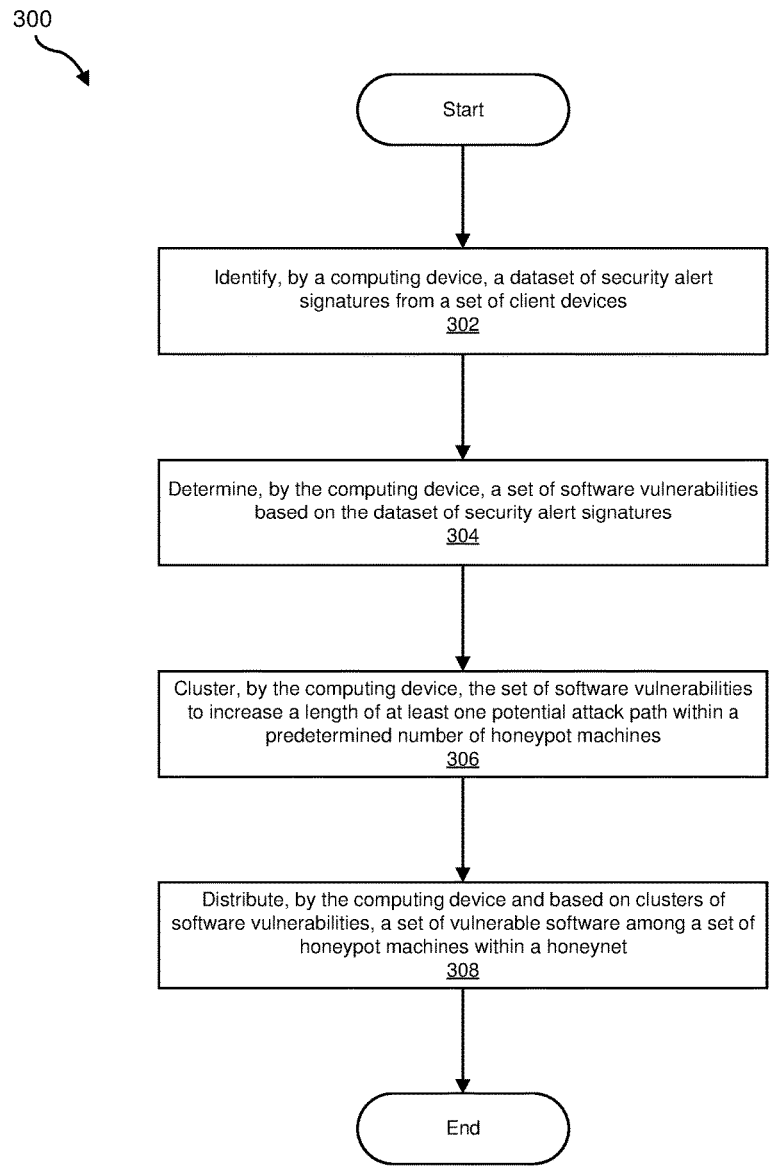
FIG. 3 is a flow diagram of an example method for creating a deception computing system.

FIG. 3 is a flow diagram of an example computer-implemented method 300 for creating a deception computing system. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may identify, by a computing device, a dataset of security alert signatures from a set of client devices. For example, identification module 104 may, as part of computing device 202 in FIG. 2, identify dataset of security alert signatures 212 from set of client devices 206.

Identification module 104 may identify dataset of security alert signatures 212 in a variety of ways. In one example, identification module 104 may collect all security data from set of client devices 206 and, subsequently, identify dataset of security alert signatures 212 from the security data. In another example, identification module 104 may identify specific data on security alert signatures from each device within set of client devices 206 and, subsequently, collect security alert signatures from each device. Furthermore, in some examples, all or a portion of dataset of security alert signatures 212 may be created or modified by an administrator in order to help train the system to recognize software vulnerabilities.

In one embodiment, dataset of security alert signatures 212 may include, for each security alert signature, an identifier of an attack, a description of the attack, a source identifier of an origin client device, and/or a destination identifier of an attacked client device. In this embodiment, the identifier of the attack may include a unique number or signature that helps to distinguish an individual attack. The source identifier and/or the destination identifier may include an Internet Protocol (IP) address of the device and/or a device name or other unique identifier. Additionally, dataset of security alert signatures 212 may further include a timestamp of the attack, a username associated with the attack, or other descriptive information about the attack. Furthermore, attacks may include both confirmed attacks and security events considered to be potential attacks. In this embodiment, the origin client device may represent the origin or suspected origin of an attack. Dataset of security alert signatures 212 may also include aggregate data, such as a count of each type of security alert signature or unique phrases from descriptions of attacks.

Figure 4:
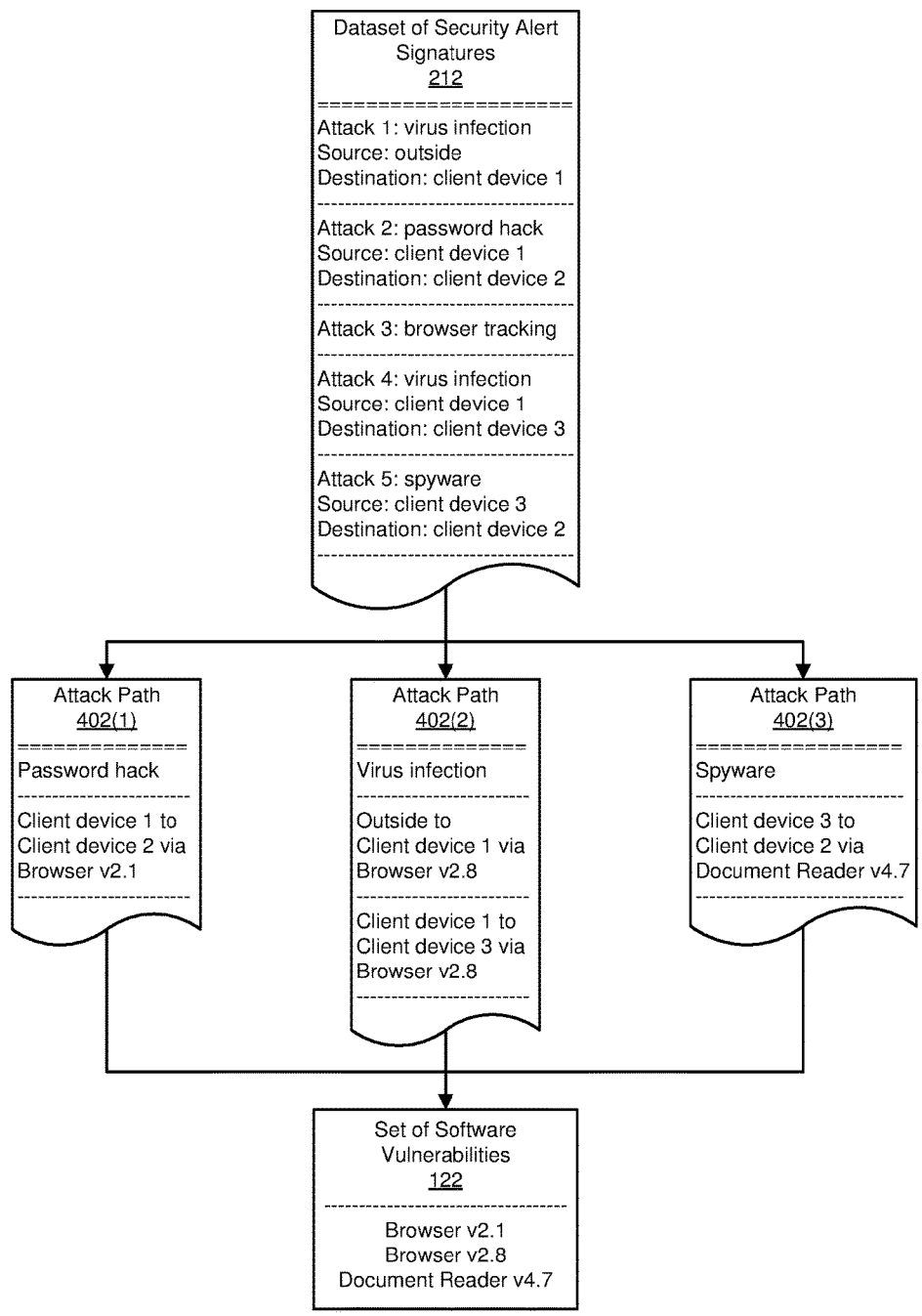
FIG. 4 is a block diagram of an example dataset of security alert signatures used to determine an example set of software vulnerabilities.

As illustrated in FIG. 4, dataset of security alert signatures 212 may include multiple attacks or security events with various descriptions (e.g., "virus infection," "password hack," "browser tracking," and "spyware"). Each of these attacks or security events may or may not include source and/or destination identifiers. For example, "Attack 1" may represent an attack on a client device (e.g., "client device 1") from a non-client device outside of an organization's network (e.g., "outside"). "Attack 3" may represent a local attack that does not laterally attack another client device and, thus, has no source identifier. Alternatively, specific information about the source and/or destination identifiers may be missing from dataset of security alert signatures 212 or not collected by security software.

Returning to FIG. 3, at step 304, one or more of the systems described herein may determine, by the computing device, a set of software vulnerabilities based on the dataset of security alert signatures. For example, determination module 106 may, as part of computing device 202 in FIG. 2, determine set of software vulnerabilities 122 based on dataset of security alert signatures 212.

Determination module 106 may determine set of software vulnerabilities 122 in a variety of ways. In some examples, determination module 106 may determine set of software vulnerabilities 122 by performing data mining on dataset of security alert signatures 212, correlating a vulnerable software with a security alert signature, identifying an attack resulting from the vulnerable software, and/or identifying an attack path involving the vulnerable software. The term "data mining," as used herein, generally refers to a method of examining a large dataset to extract useful information. Notably, data mining may include text mining methods, such as natural language processing (NLP) or part-of-speech tagging (POST), that may extract information from textual descriptions of attacks. Furthermore, software vulnerabilities may include specific parts or elements of software, vulnerable versions of software, combinations of software, and/or combinations of software running on hardware that may cause a vulnerability. By performing data mining on dataset of security alert signatures 212, determination module 106 may identify causes and effects of each attack and software vulnerabilities that may contribute to the attacks and/or be attractive to attackers. Determination module 106 may further correlate specific vulnerabilities with individual machines to identify machine attributes.

In the above examples, the attack path may include a sequence of client devices compromised by related attacks and a sequence of vulnerable software on the compromised client devices. For example, security software may determine that an attacker who compromised a client device gains access to a second client device from the first compromised device. In this example, the attack path may include information on both client devices and the order in which they were attacked. The attack path may further include data on software vulnerabilities used to gain access to each client device.

In the example of FIG. 4, determination module 106 may identify an attack path 402(1), an attack path 402(2), and an attack path 402(3) for three types of attacks (e.g., "password hack," "virus infection," and "spyware," respectively) after analyzing dataset of security alert signatures 212. From the information in attack paths 402(1), 402(2), and 402(3), determination module 106 may then determine that two versions of a web browser (e.g., "Browser v2.1" and "Browser v2.8") and a document reader (e.g., "Document Reader v4.7") are vulnerable to attack. Determination module 106 may then group these software as set of software vulnerabilities 122.

Returning to FIG. 3, at step 306, one or more of the systems described herein may cluster, by the computing device, the set of software vulnerabilities to increase a length of at least one potential attack path within a predetermined number of honeypot machines. For example, clustering module 108 may, as part of computing device 202 in FIG. 2, cluster set of software vulnerabilities 122 to increase a length of potential attack path 124 within a predetermined number of honeypot machines.

Clustering module 108 may cluster set of software vulnerabilities 122 in a variety of ways. As used herein, the term "clustering" generally refers to a method of analyzing and grouping similar data and/or related objects to distinguish it from less similar data. Examples of clustering may include, without limitation, k-nearest neighbors (k-NN) algorithms, k-means clustering, expectation-maximization algorithms, hierarchical clustering, or any other suitable method.

In some embodiments, clustering module 108 may cluster set of software vulnerabilities 122 to increase the length of potential attack path 124 by creating a matrix of attacks from origin honeypot machines to destination honeypot machines for set of software vulnerabilities 122, calculating a likelihood of an attack traversing from an origin honeypot machine to a destination honeypot machine, and determining that a cluster of software vulnerabilities increases the likelihood of the attack traversing to the destination honeypot machine. In these embodiments, the matrix of attacks may include information derived from dataset of security alert signatures 212, such as security events derived from applying NLP methods to descriptions of attacks. The matrix may also include the likelihood of each attack traversing from origin machines to destination machines.

Figure 5:
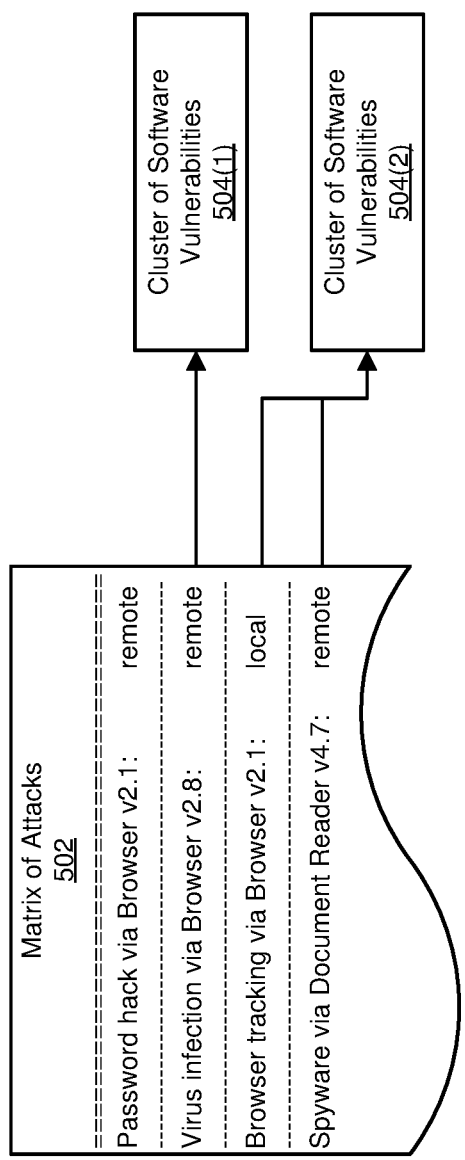
FIG. 5 is a block diagram of an example clustering of software vulnerabilities.

As shown in FIG. 5, a matrix of attacks 502 includes information about software vulnerabilities for each vulnerable software. Matrix of attacks 502 also includes a likelihood of an attack involving a vulnerability traversing to another device (e.g., "remote" if likely to traverse to another machine and "local" if unlikely to traverse to another machine). Clustering module 108 may cluster software vulnerabilities such that a software vulnerability with a likelihood of a local attack becomes more likely to be involved in a remote attack. For example, a cluster of software vulnerabilities 504(1) may include a vulnerability with a high chance of traversing to another machine (e.g., "virus infection via Browser v2.8") and not require clustering with additional software vulnerabilities. A cluster of software vulnerabilities 504(2) may group a vulnerability that has a high chance of traversing to another machine (e.g., "spyware via Document Reader v4.7") with a vulnerability that has a low chance of traversing to another machine (e.g., "browser tracking via Browser v2.1") in order to improve overall likelihood of an attack traversing to a destination honeypot machine. In alternate examples, matrix of attacks 502 may indicate whether two separate attacks are likely to be locally related on a single machine or remotely related on two networked machines.

Additionally or alternatively, in the above embodiments, clustering module 108 may cluster set of software vulnerabilities 122 to increase the length of potential attack path 124 by dividing the software vulnerabilities into a number of different sets of software vulnerabilities based on the predetermined number of honeypot machines. For example, an organization may have a limited number honeypot machines, constrained by limited resources, and clustering module 108 may cluster set of software vulnerabilities 122 into a number of clusters based on the number of honeypot machines. In this example, creating different clusters for different honeypot machines may decrease the likelihood of honeynet 208 being detected as a deception system.

In the example of FIG. 5, cluster of software vulnerabilities 504(2) may increase the potential attack path of a honeypot machine installed with a software vulnerability likely to be associated with a local attack (e.g., "Browser v2.1") by adding a software vulnerability with a likelihood of being associated with a remote attack (e.g., "Document Reader v4.7"). In this example, the potential attack path may be increased to one additional honeypot machine. Furthermore, increasing the likelihood of an attack traversing to a destination machine may also increase the likelihood of a longer potential attack path 124. In additional embodiments, clustering module 108 may cluster software vulnerabilities to increase the length of multiple potential attack paths.

Returning to FIG. 3, at step 308, one or more of the systems described herein may distribute, by the computing device and based on clusters of software vulnerabilities, a set of vulnerable software among a set of honeypot machines within a honeynet. For example, distribution module 110 may, as part of computing device 202 in FIG. 2, distribute, based on clusters of software vulnerabilities 126, set of vulnerable software 214 among set of honeypot machines 210 within honeynet 208.

Distribution module 110 may distribute set of vulnerable software 214 in a variety of ways. In some examples, distribution module 110 may distribute set of vulnerable software 214 among set of honeypot machines 210 by assigning a distribution of vulnerable software to a honeypot machine based on a cluster of software vulnerabilities, assigning the distribution of vulnerable software to the honeypot machine based on a configuration of the set of honeypot machines, instructing set of honeypot machines 210 to install set of vulnerable software 214, and/or sending a distribution of set of vulnerable software 214 to set of honeypot machines 210 to an administrator.

In the above examples, distribution module 110 may directly instruct honeypot machines to install vulnerable software or may send a list of vulnerable software versions and configurations of clusters to an administrator to install on honeypot machines. In the example of FIG. 2, distribution module 110 may send set of vulnerable software 214 to set of honeypot machines 210 via network 204 in connection with honeynet 208. In alternate examples, computing device 202 may be directly connected to set of honeypot machines 210, and distribution module 110 may send set of vulnerable software 214 from within honeynet 208. Although illustrated as a network of honeypot machines in FIG. 2, honeynet 208 may be a portion of a system containing set of client devices 206, and set of honeypot machines 210 may be disguised among set of client devices 206. Distribution module 110 may also assign clusters of software vulnerabilities based on the configuration of multiple honeypot machines and how they are networked to maximize the likelihood of an attack traversing to other networked honeypot machines.

In the example of FIG. 5, cluster of software vulnerabilities 504(1) may include a specific version of one type of software (e.g., "Browser v2.8") to be installed on a single honeypot machine. Cluster of software vulnerabilities 504(2) may include two different software (e.g., "Browser v2.1" and "Document Reader v4.7"), which may both be installed on a second honeypot machine. In other examples, multiple honeypot machines may install the same software versions and/or combinations of software while other software versions may not be installed on any honeypot machine. Alternatively, a honeypot machine may install multiple vulnerable versions of the same software or similar software. Additionally, distribution module 110 may prioritize installation of clusters or configurations of software with longer potential attack paths or higher likelihood of traversing to multiple honeypots.

In one embodiment, the systems described herein may further include distributing a new set of vulnerable software among set of honeypot machines 210 based on a change in dataset of security alert signatures 212. In this embodiment, computing device 202 may re-cluster a new set of software vulnerabilities derived from changes in dataset of security alert signatures 212 and, subsequently, update set of honeypot machines 210 with a more current set of vulnerable software. The update may include uninstalling existing software, installing new vulnerable software, and/or updating existing versions of vulnerable software to versions that are more likely to attract attackers. Furthermore, software may be updated due to changes in the number or type of honeypot machines within honeynet 208.

As explained above in connection with method 300 in FIG. 3, the disclosed systems and methods may, by automatically determining what vulnerabilities to use in a honeynet, improve deception technology to be more timely. Specifically, the disclosed systems and methods may analyze current data on security alert signatures collected from client devices. By performing techniques such as natural language processing on the security alert signatures, the systems and methods described herein may derive a set of software vulnerabilities that are prone to attack.

By performing additional data analysis techniques such as matrix calculations on the software vulnerabilities, the disclosed systems and methods may then determine how to cluster the vulnerabilities to increase potential attack paths. In some examples, the systems and methods described herein may also customize clusters to maximize a limited number of honeypot machines while ensuring diversity of installed vulnerable software to prevent attackers from recognizing the honeynet. Additionally, the systems and methods described herein may distribute vulnerable software to honeypots within a honeynet and periodically update the distribution based on changing data on security alert signatures.

As detailed above, by automatically updating clusters of vulnerable software, the disclosed systems and methods may more easily combat new strategies of attack using the best vulnerabilities to attract attackers. Furthermore, by optimizing clusters of vulnerabilities to encourage longer attack paths, the disclosed systems and methods may keep attackers within the honeynet for longer periods of time. Thus, the systems and methods described herein may improve the effectiveness of deception systems.

Figure 6:
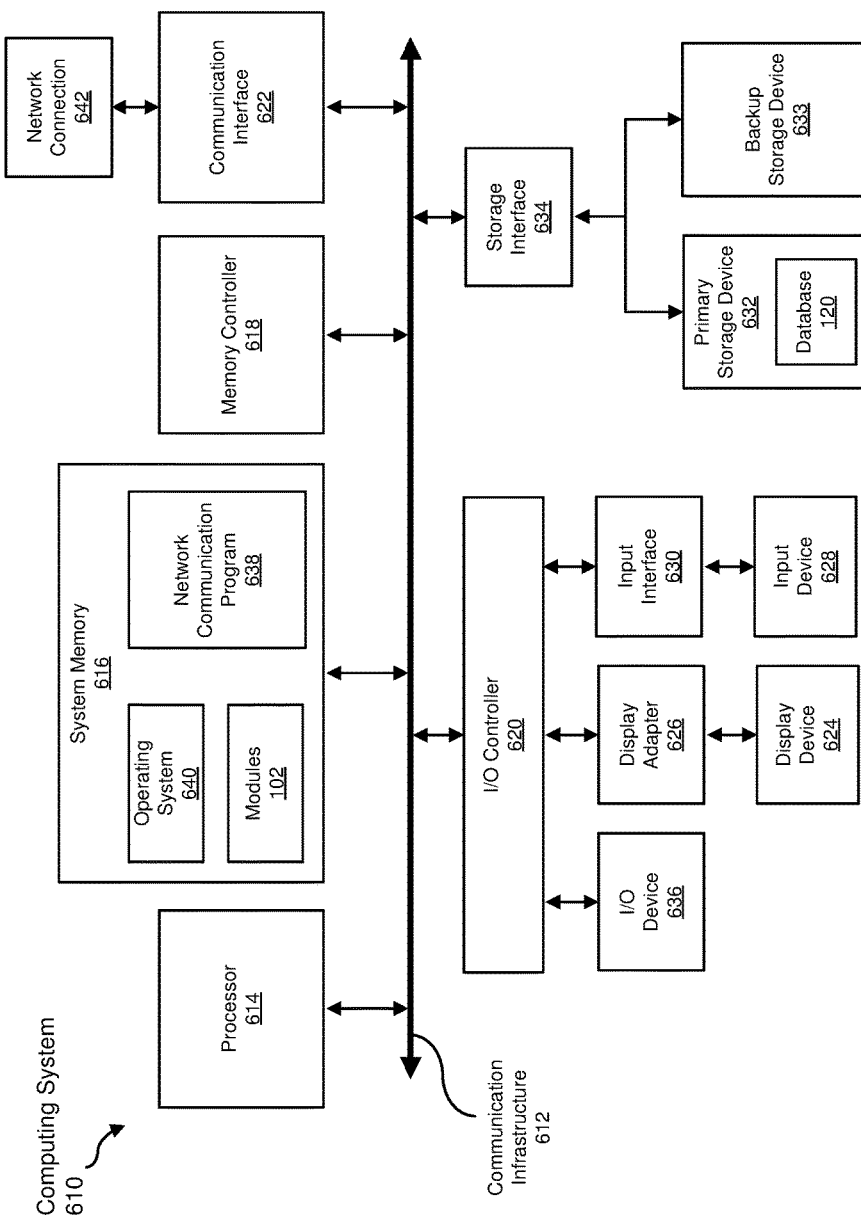
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 624 for execution by processor 614. In one example, operating system 624 may include and/or represent software that manages computer hardware and software resources and/or provides common services to computer programs and/or applications on computing system 610. Examples of operating system 624 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application-Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an ASIC adapted to implement one or more of the example embodiments disclosed herein.

Figure 7:
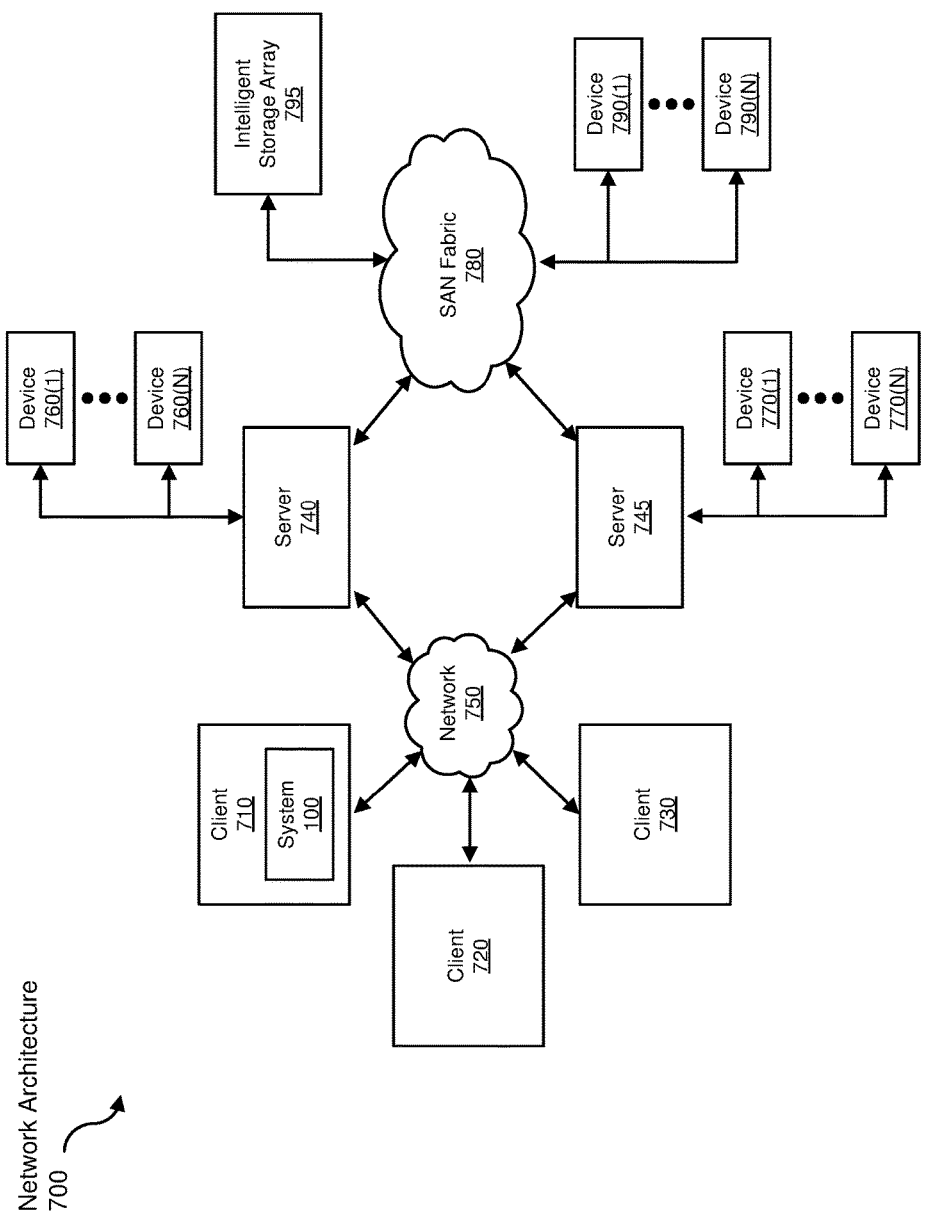
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for creating a deception computing system.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered examples in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive security alert signatures to be transformed, transform the security alert signatures, output a result of the transformation to a storage or output device, use the result of the transformation to create clusters of software vulnerabilities, and store the result of the transformation in a server or database. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for creating a deception computing system, at least a portion of the method being performed by a computing device comprising at least one processor, the method comprising:
   identifying, by the computing device, a dataset of security alert signatures from a set of client devices;
   determining, by the computing device, a set of software vulnerabilities based on the dataset of security alert signatures;

clustering, by the computing device, the set of software vulnerabilities to increase a length of at least one potential attack path within a predetermined number of honeypot machines; and distributing, by the computing device, a set of vulnerable software among a set of honeypot machines within a honeynet by, for each honeypot machine, assigning a distribution of vulnerable software to the honeypot machine based on a cluster of software vulnerabilities.

2. The method of claim 1, wherein the dataset of security alert signatures comprises, for each security alert signature, at least one of:

an identifier of an attack;
a description of the attack;
a source identifier of an origin client device; and
a destination identifier of an attacked client device.

3. The method of claim 1, wherein determining the set of software vulnerabilities comprises at least one of:

performing data mining on the dataset of security alert signatures;
correlating a vulnerable software with a security alert signature;
identifying an attack resulting from the vulnerable software; and
identifying an attack path involving the vulnerable software.

4. The method of claim 3, wherein the attack path comprises:

a sequence of client devices compromised by related attacks; and
a sequence of vulnerable software on the compromised client devices.

5. The method of claim 1, wherein clustering the set of software vulnerabilities to increase the length of the potential attack path comprises:

creating a matrix of attacks from origin honeypot machines to destination honeypot machines for the set of software vulnerabilities;
calculating a likelihood of an attack traversing from an origin honeypot machine to a destination honeypot machine; and
determining that a cluster of software vulnerabilities increases the likelihood of the attack traversing to the destination honeypot machine.

6. The method of claim 1, wherein clustering the set of software vulnerabilities to increase the length of the potential attack path comprises dividing the software vulnerabilities into a number of different sets of software vulnerabilities based on the predetermined number of honeypot machines.

7. The method of claim 1, wherein distributing the set of vulnerable software among the set of honeypot machines comprises at least one of:

assigning the distribution of vulnerable software to the honeypot machine based on a configuration of the set of honeypot machines;
instructing the set of honeypot machines to install the set of vulnerable software; and
sending a distribution of the set of vulnerable software to the set of honeypot machines to an administrator.

8. The method of claim 1, further comprising distributing a new set of vulnerable software among the set of honeypot machines based on a change in the dataset of security alert signatures.

9. A system for creating a deception computing system, the system comprising:

an identification module, stored in memory, that identifies, by a computing device, a dataset of security alert signatures from a set of client devices;

a determination module, stored in memory, that determines, by the computing device, a set of software vulnerabilities based on the dataset of security alert signatures;

a clustering module, stored in memory, that clusters, by the computing device, the set of software vulnerabilities to increase a length of at least one potential attack path within a predetermined number of honeypot machines;

a distribution module, stored in memory, that distributes, by the computing device, a set of vulnerable software among a set of honeypot machines within a honeynet by, for each honeypot machine, assigning a distribution of vulnerable software to the honeypot machine based on a cluster of software vulnerabilities; and at least one processor that executes the identification module, the determination module, the clustering module, and the distribution module.

10. The system of claim 9, wherein the dataset of security alert signatures comprises, for each security alert signature, at least one of:

an identifier of an attack;
a description of the attack;
a source identifier of an origin client device; and
a destination identifier of an attacked client device.

11. The system of claim 9, wherein the determination module determines the set of software vulnerabilities by at least one of:

performing data mining on the dataset of security alert signatures;
correlating a vulnerable software with a security alert signature;
identifying an attack resulting from the vulnerable software; and
identifying an attack path involving the vulnerable software.

12. The system of claim 11, wherein the attack path comprises:

a sequence of client devices compromised by related attacks; and
a sequence of vulnerable software on the compromised client devices.

13. The system of claim 9, wherein the clustering module clusters the set of software vulnerabilities to increase the length of the potential attack path by:

creating a matrix of attacks from origin honeypot machines to destination honeypot machines for the set of software vulnerabilities;
calculating a likelihood of an attack traversing from an origin honeypot machine to a destination honeypot machine; and
determining that a cluster of software vulnerabilities increases the likelihood of the attack traversing to the destination honeypot machine.

14. The system of claim 9, wherein the clustering module clusters the set of software vulnerabilities to increase the length of the potential attack path by dividing the software vulnerabilities into a number of different sets of software vulnerabilities based on the predetermined number of honeypot machines.

15. The system of claim 9, wherein the distribution module distributes the set of vulnerable software among the set of honeypot machines by at least one of:

assigning the distribution of vulnerable software to the honeypot machine based on a configuration of the set of honeypot machines;

instructing the set of honeypot machines to install the set of vulnerable software; and sending a distribution of the set of vulnerable software to the set of honeypot machines to an administrator.

16. The system of claim 9, further comprising distributing a new set of vulnerable software among the set of honeypot machines based on a change in the dataset of security alert signatures.

17. A non-transitory computer-readable medium comprising one or more computer-executable instructions that, when executed by at least one processor of a computing device, cause the computing device to:

identify, by the computing device, a dataset of security alert signatures from a set of client devices;

determine, by the computing device, a set of software vulnerabilities based on the dataset of security alert signatures;

cluster, by the computing device, the set of software vulnerabilities to increase a length of at least one potential attack path within a predetermined number of honeypot machines; and distribute, by the computing device, a set of vulnerable software among a set of honeypot machines within a honeynet by, for each honeypot machine, assigning a distribution of vulnerable software to the honeypot machine based on a cluster of software vulnerabilities.

18. The non-transitory computer-readable medium of claim 17, wherein the dataset of security alert signatures comprises, for each security alert signature, at least one of:

an identifier of an attack;

a description of the attack;

a source identifier of an origin client device; and a destination identifier of an attacked client device.

19. The non-transitory computer-readable medium of claim 17, wherein the computer-executable instructions cause the computing device to determine the set of software vulnerabilities by at least one of:

performing data mining on the dataset of security alert signatures;

correlating a vulnerable software with a security alert signature;

identifying an attack resulting from the vulnerable software; and identifying an attack path involving the vulnerable software.

20. The non-transitory computer-readable medium of claim 19, wherein the attack path comprises:

a sequence of client devices compromised by related attacks; and a sequence of vulnerable software on the compromised client devices.

* * * * *